Figure 3:
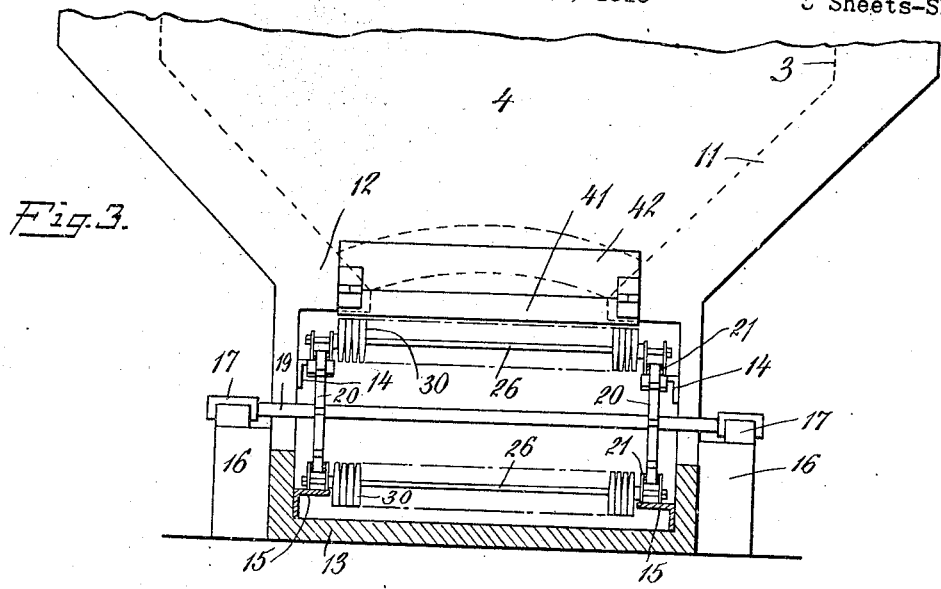

Apr. 24, 1923.
H. G. BARNHURST
1,452,952
PULVERIZED FUEL FURNACE
Filed Feb. 17, 1919     3 Sheets-Sheet 1
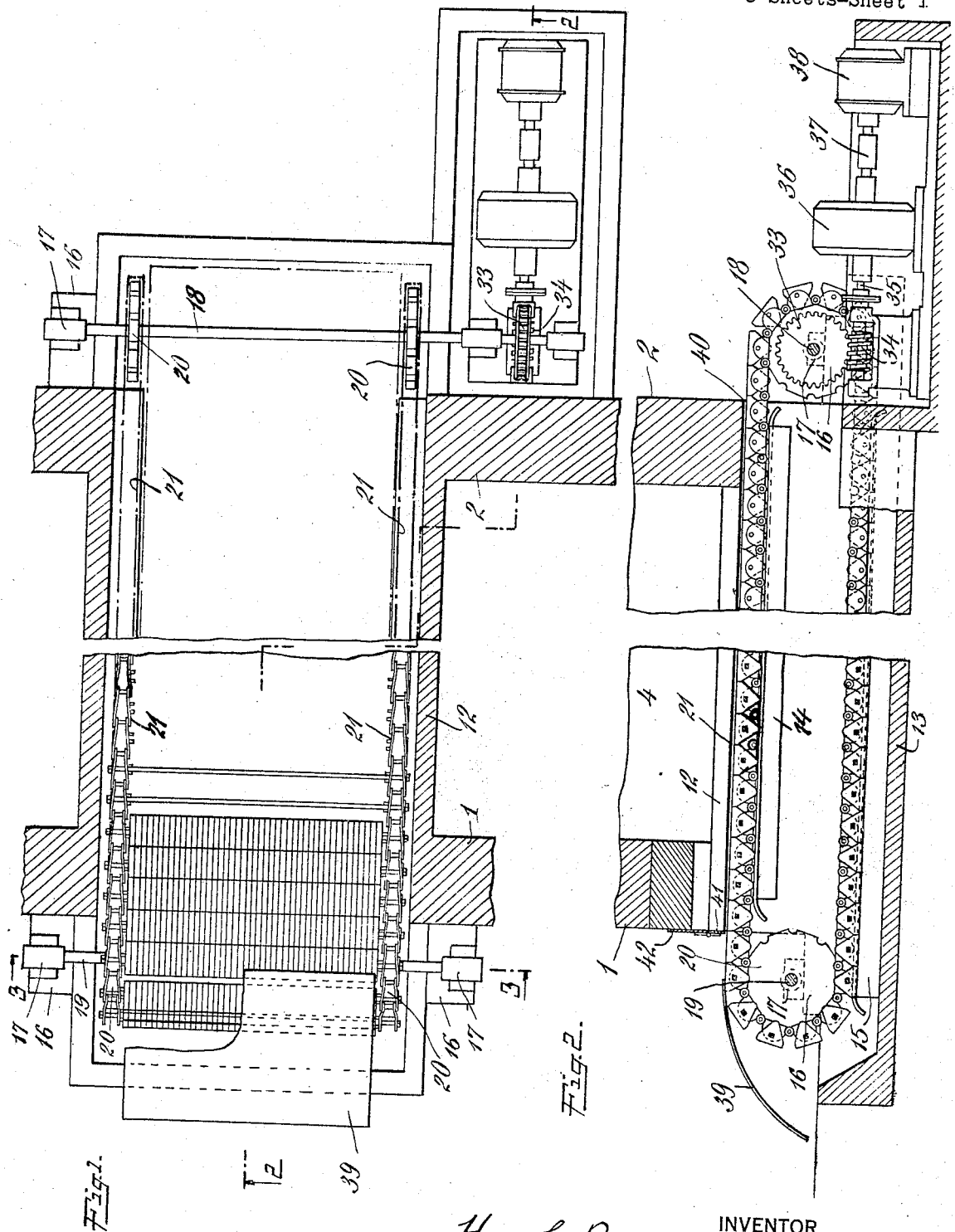
INVENTOR
Henry G. Barnhurst,
BY
Pennie, Davis, Marvin & Edmonds
ATTORNEYS Apr. 24, 1923.

H. G. BARNHURST

PULVERIZED FUEL FURNACE

Filed Feb. 17, 1919

1,452,952

3 Sheets-Sheet 2

INVENTOR
Henry G. Barnhurst,
BY
Pennie, Davis, Marvin & Edmonds
ATTORNEYS.

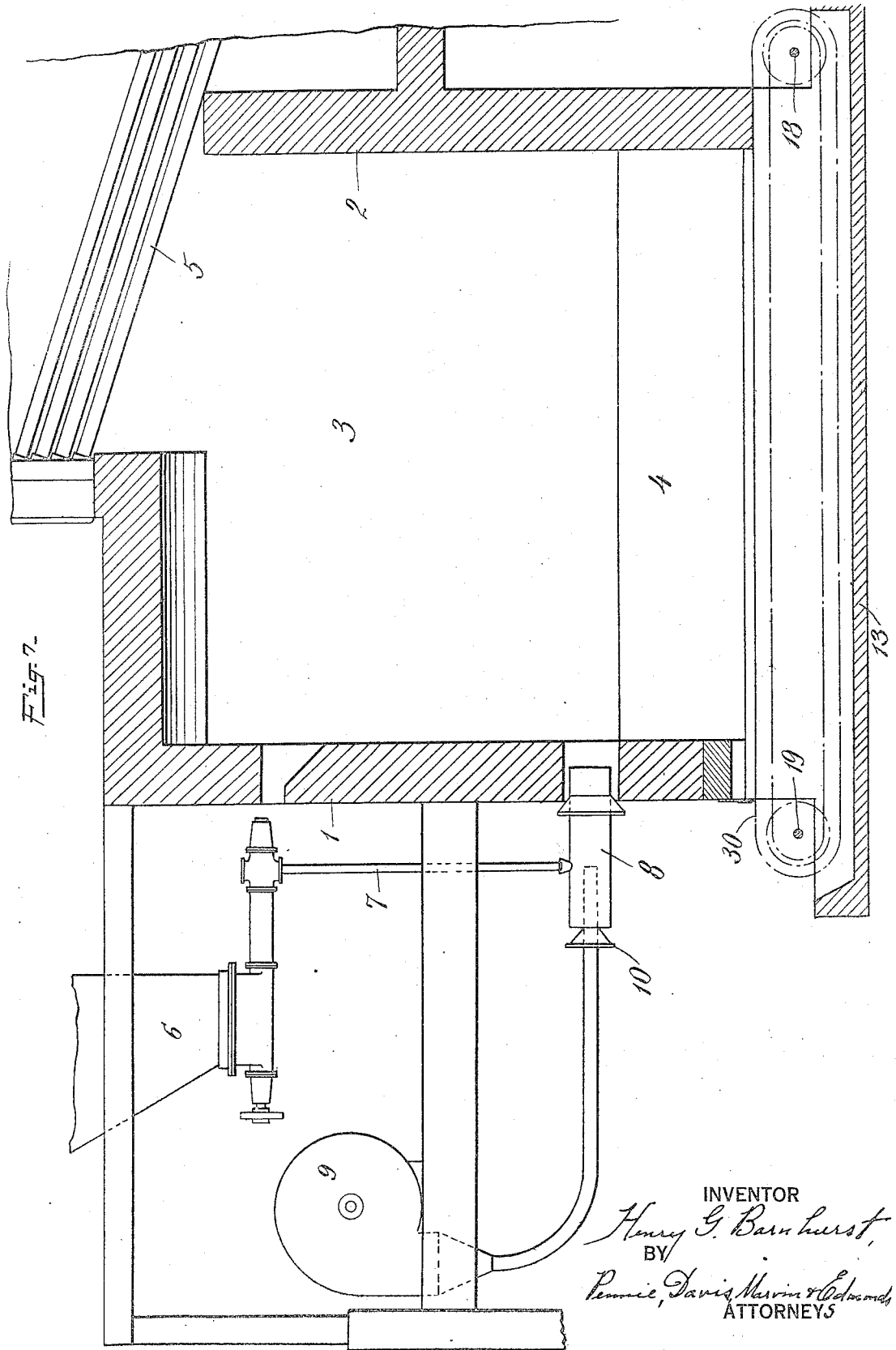

Patented Apr. 24, 1923.

1,452,952

UNITED STATES PATENT OFFICE.

HENRY G. BARNHURST, OF ALLENTOWN, PENNSYLVANIA, ASSIGNOR TO FULLER ENGINEERING COMPANY, A CORPORATION OF PENNSYLVANIA.

PULVERIZED-FUEL FURNACE.

Application filed February 17, 1919. Serial No. 277,411.

*To all whom it may concern:*

Be it known that I, HENRY G. BARN-HURST, a citizen of the United States, residing at 1441 Hamilton Street, Allentown, in the county of Lehigh, State of Pennsylvania, have invented certain new and useful Improvements in Pulverized-Fuel Furnaces; and I do hereby declare the following to be a full, clear, and exact description of the invention, such as will enable others skilled in the art to which it appertains to make and use the same.

This invention relates to furnaces adapted for the utilization of pulverized coal. In such furnaces it is necessary, in order that pulverized fuel may be burned with any degree of success, that the cross sectional area of the combustion chamber transverse to the direction of travel of the products of combustion be large in proportion to the air and fuel admitted so that the velocity of flow of the gases will be below that which will produce erosion of the refractory lining of the walls of the furnace. Failure to recognize the necessity for properly proportioning the combustion chamber with reference to the velocity of travel of the hot gases through the furnace has been the principal reason for the lack of success of attempts to burn pulverized fuel in furnaces originally designed and built for the combustion of lump fuel. In such bases, the high temperature existing within the furnace during combustion of pulverized fuel reduces the refractory lining to a more or less plastic condition, and in this condition, the high velocity of the furnace gases results in erosion which soon amounts to destruction. A considerable increase in the volume of the combustion chamber is required, therefore, in order that any substantial degree of success in the burning of pulverized fuel may be attained. In many cases, such an increase of volume is obtained by remodelling the combustion chambers of existing furnaces.

While the amount of solid residue resulting from the combustion of pulverized fuel is considerably less than in the case of lump fuel, in time it amounts to a substantial deposit, particularly at the bottom of the combustion chamber of a furnace. The portions of such a deposit lying upon or immediately adjacent the floor of the combustion chamber, where heat is most rapidly absorbed, are generally in the form of fine sand, but in the upper portions of the mass the residue assumes the form of slag under the influence of the high temperature existing in the combustion chamber. Any considerable accumulation of residue results in a corresponding decrease in the space in the combustion chamber available for the burning gases. Since the proper proportioning of the combustion chamber is of particular importance, for reasons explained above, any substantial alterations in its dimensions result in a marked decrease in the efficiency of the furnace, and particularly is this the case where existing furnaces have been remodelled for the purpose of burning pulverized fuel, as in such cases there is usually little or no excess volume of the combustion chamber over the minimum amount required for efficient combustion, and any decrease in the volume materially cuts down the efficiency.

In order to prevent the accumulation of residue, it is the practice to remove the same from time to time, but this requires manual labor, necessitates the insertion of suitable tools within the combustion chamber and, if not frequently performed, will not keep down the accumulation of material sufficiently to prevent detrimental effects upon the efficiency of combustion as well as upon the furnace structure, due to erosion and other causes.

It is an object of this invention to obviate the disadvantages mentioned above by providing a furnace having a relatively large combustion chamber into which a mixture of pulverized fuel and air may be fed and which is provided with means for removing the solid residues of combustion as they are produced, so that accumulation thereof will be prevented and the entire space within the combustion chamber will be available at all times for the burning of the fuel. The possibility of variations in efficiency due to changes in volume of the space occupied by the burning fuel is, therefore, eliminated, and since the residues are continually removed, they are discharged in sand-like condition, rather than in the form of relatively large masses of slag.

Figure 4:
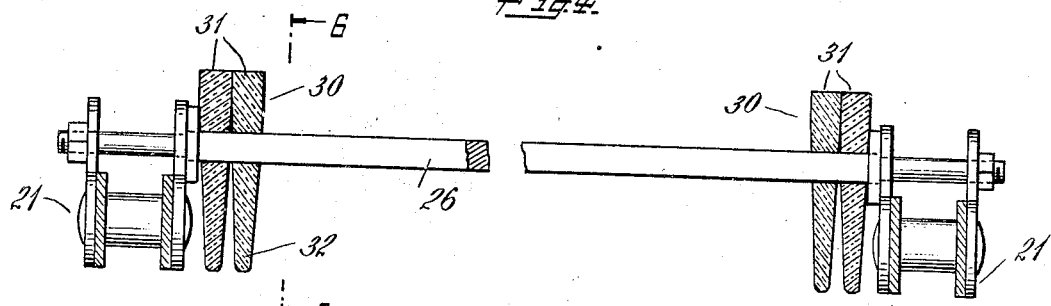
Figure 5:
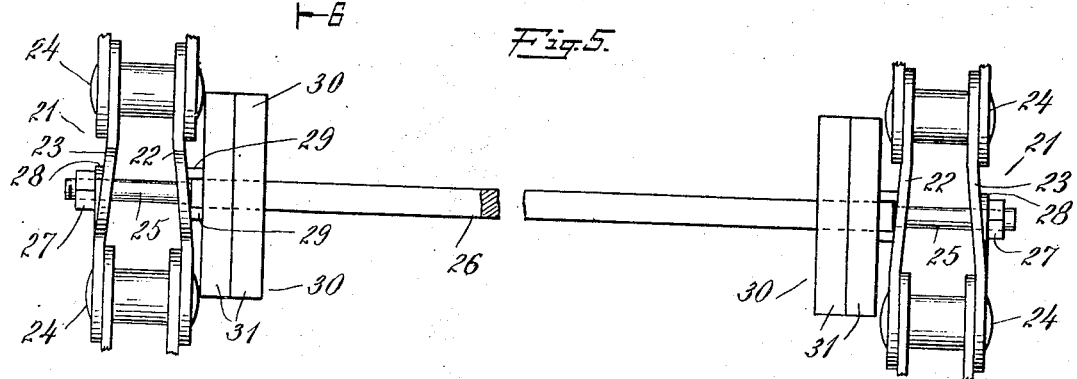
Figure 6:
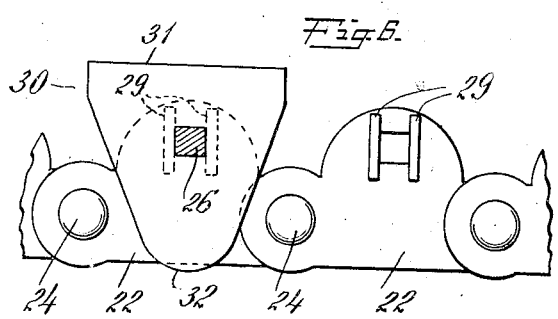

The particular nature of the invention, as well as other advantages thereof, will appear more clearly from a description of a preferred embodiment, and for this purpose the furnace has been illustrated in connection with a water tube boiler. In the accompanying drawings, Fig. 1 is a plan view of the apparatus for removing the residues of combustion, the walls of the furnace being shown in section; Fig. 2 is an elevation in section along the line 2—2 of Fig. 1; Fig. 3 is a transverse section along the line 3—3 of Fig. 1; Fig. 4 is an enlarged sectional view through the sprocket chains and the elements carried thereon; Fig. 5 is a plan view of a portion of the chains and other elements; Fig. 6 is a detail view in section along the line 6—6 of Fig. 4; and Fig. 7 is a sectional elevation of the combustion chamber portion of the complete furnace, the movable hearth being shown in outline.

Referring to the drawings in which similar reference characters denote similar parts throughout the several views, the furnace has a front wall 1, rear wall 2 and side walls 3 forming a combustion chamber 4 of relatively large volume and otherwise designed in accordance with the principles applicable to furnaces in which pulverized fuel is to be burned. The hot gases of combustion flow to the water tubes 5 through a passage at the top of the combustion chamber.

Pulverized fuel is stored in a hopper 6 and fed into a tube 7 through which it passes by gravity into a burner nozzle 8 projecting into an opening in the front wall of the furnace. A blower 9 is connected to the nozzle 8 to produce a current of air for carrying the pulverized fuel into the furnace. Additional air may be entrained and carried into the furnace through the annular space surrounding the blower tube, the amount of this additional air being subject to the control of a regulating cone 10 slidably mounted on the blower tube.

The side walls 3 of the furnace are formed with lower inclined portions 11 which terminate in overhanging portions 12 carried upon vertical walls mounted upon a suitable foundation 13 which also constitutes a tank or trough adapted to contain liquid for cooling the movable hearth of the furnace.

Mounted on the vertical walls are upper hearth-supporting guides 14, and similar lower guides 15 are mounted on the sides of the trough. Upon the foundations of the furnace and beyond each end of the combustion chamber are pedestals 16 provided with bearings 17 within which are mounted shafts 18 and 19. Upon each of these shafts and lying near the side walls of the tank and the vertical portions of the combustion chamber are sprocket wheels 20, over which pass sprocket chains 21 carrying the heat resisting elements of the hearth.

The construction of the sprocket chains appears most clearly in Figs. 4, 5 and 6. Each link of each chain is made up of two parts, an inner link 22 and an outer link 23. One end of each of the links is placed out of alinement with the outer end, so that the links may be fitted together to make up a chain, pivot pins 24 of any suitable form being used for connecting the links to each other. Both the inner and outer links of each pair are provided with circular apertures in alinement with each other, and adapted to receive the cylindrical end 25 of a transverse rod having a rectangular cross section throughout the portion lying between the inner links. The transverse rods are adapted to be held in place by nuts 27 screwed upon their ends, and in order to give a flat bearing surface for the nuts, the outer link 23 of each pair is provided with a boss 28. The inner link 22 of each pair is provided with a pair of parallel ribs 29 between which the end of the rectangular portion 26 of the rod is adapted to fit to prevent the rod from turning in the links.

The transverse rods serve as supports for the heat resisting elements 30, a number of which are mounted upon the rectangular portion of each rod, correspondingly shaped apertures being provided in the elements for this purpose. These elements, which may be constructed of cast iron, fire brick or any other suitable heat resisting material, have a triangular shape, and the portion 31 which is exposed to the combustion chamber during travel through the same, is somewhat wider than the portion 32 located on the other side of the supporting rod. There is thus formed in effect a series of heat resisting grate bars between the sprocket chains, but since each of these bars is made up of a plurality of separate elements, any damaged or broken elements may be replaced without requiring that the other elements of the same bar be discarded. The construction thus lends itself to the cheap and convenient renewal of damaged or defective elements.

For the purpose of moving the hearth, the shaft 18 is extended beyond the bearing 17 at one side of the apparatus and carries a gear 33 which meshes with a worm 34 on a shaft 35 leading to a speed reducing mechanism 36 of any suitable construction. The driving element of the speed reducing mechanism is connected by means of a shaft 37 to a motor 38 or other source of power. For the purpose of removing from the hearth the residue brought out of the combustion chamber, there is provided a suitable chute 39, the upper end of which lies immediately above the heat resisting elements as they leave the combustion chamber, but it will be understood that instead of the exact arrangement shown any other suitable device for removing material from the bars of the hearth may be used. At the point 40 where the hearth enters the combustion chamber the wall of the latter may be brought closely adjacent the tops of the heat resisting bars, because there will be no material upon these bars and only enough clearance to permit the hearth to pass through the wall of the combustion chamber need be provided. At the other end of the combustion chamber, it is necessary to provide sufficient clearance for the passage of the material being carried out of the chamber by the hearth. However, in order to prevent a draft through this exit, there is provided a door 41 hinged to a plate 42 attached to the outer face of the wall of the combustion chamber. As shown most clearly in Fig. 3, the ends of the door are adapted to engage the overhanging portions 12 of the wall of the combustion chamber to prevent the door from swinging inwardly and allowing air to enter the combustion chamber. The door should be of sufficiently light construction so that it may be swung outward by any deposit upon the hearth without scraping off the deposit and causing it to clog up the exit passage.

In the operation of the furnace described above, pulverized fuel is fed into the burner nozzle 8 and carried into the combustion chamber by the air blast from blower 9. Any additional air that may be required for complete combustion of the fuel is supplied through the space surrounding the blower tube. The solid residues resulting from combustion of the fuel within the chamber are deposited upon the hearth which is driven from the motor 38 under the control of the speed reducing mechanism 36. Over the upper portion of their paths, the sprocket chains of the hearth travel along the upper guides 14 to prevent the hearth from sagging while it is moving through the combustion chamber, and over the lower portion of their paths the sprocket chains travel over the lower guide 15, thus preventing sagging of the chains while they are passing through the tank. The tank is preferably filled with water or other cooling liquid so that the elements of the hearth which are heated during their passage through the combustion chamber and by the hot residues deposited thereon are cooled before they again enter the chamber. This prevents overheating of the parts of the hearth, and is also conducive to the most efficient removal of the residues, since when deposited upon a relatively cool surface, they are in a sand-like condition as distinguished from the slag-like condition assumed by such residues when they are deposited upon a relatively hot surface and are also subjected to the high temperature existing within the combustion chamber. The sand-like condition of the residues enables them to be readily removed from the hearth as they are carried out of the combustion chamber.

I claim:

1. A furnace for burning pulverized fuel, comprising the combination of a relatively large combustion chamber, means for feeding a mixture of pulverized fuel and air into the combustion chamber, an endless conveyor mounted to travel through the bottom of the combustion chamber, shafts for supporting the conveyor, means for driving one of the shafts to cause travel of the conveyor to carry residues of combustion deposited thereon out of the combustion chamber, and means at the front and rear of the furnace contacting substantially closely with the conveyor and preventing a connection between the interior of the furnace and the atmosphere.

2. A furnace for burning pulverized fuel, comprising the combination of a relatively large combustion chamber, means for feeding a mixture of pulverized fuel and air into the combustion chamber, an endless conveyor mounted to travel through the bottom of the combustion chamber over the upper portion of its path, shafts located outside the combustion chamber and over which the conveyor passes, means for driving one of the shafts to cause travel of the conveyor to carry residues of combustion deposited thereon out of the combustion chamber, and a tank beneath the combustion chamber, adapted to contain cooling liquid to submerge the conveyor while it is travelling over the lower portion of its path.

3. A furnace for burning pulverized fuel, comprising the combination of a relatively large combustion chamber, means for feeding a mixture of pulverized fuel and air into the combustion chamber, means for effecting the continuous removal of the residues of combustion so that they are in a finely divided condition when removed, and an entrance aperture at the rear of the furnace substantially the size of the outer dimensions of the means for effecting the continuous removal of the residue, and means at the front of the furnace adjustable to correspond with the combined dimensions of the residue and the means for effecting the continuous removal thereof.

4. A furnace for burning pulverized fuel, comprising the combination of a relatively large combustion chamber, means for feeding a mixture of pulverized fuel and air into the combustion chamber, an endless conveyor mounted to travel through the bottom of the combustion chamber over the upper portion of its path, shafts located outside of the combustion chamber and over which the conveyor passes, means for driving one of the shafts to cause travel of the conveyor to carry residues of combustion deposited thereon out of the combustion chamber, entrance means for the endless conveyor limited to substantially the outer dimensions thereof, and an adjustable exit means at another portion of the furnace for permitting the passage therethrough of the endless conveyor and its load, and a tank beneath the combustion chamber adapted to contain cooling liquid to submerge the conveyor while it is travelling over the lower portion of its path.

In testimony whereof I affix my signature.

HENRY G. BARNHURST.